Patented Apr. 15, 1952

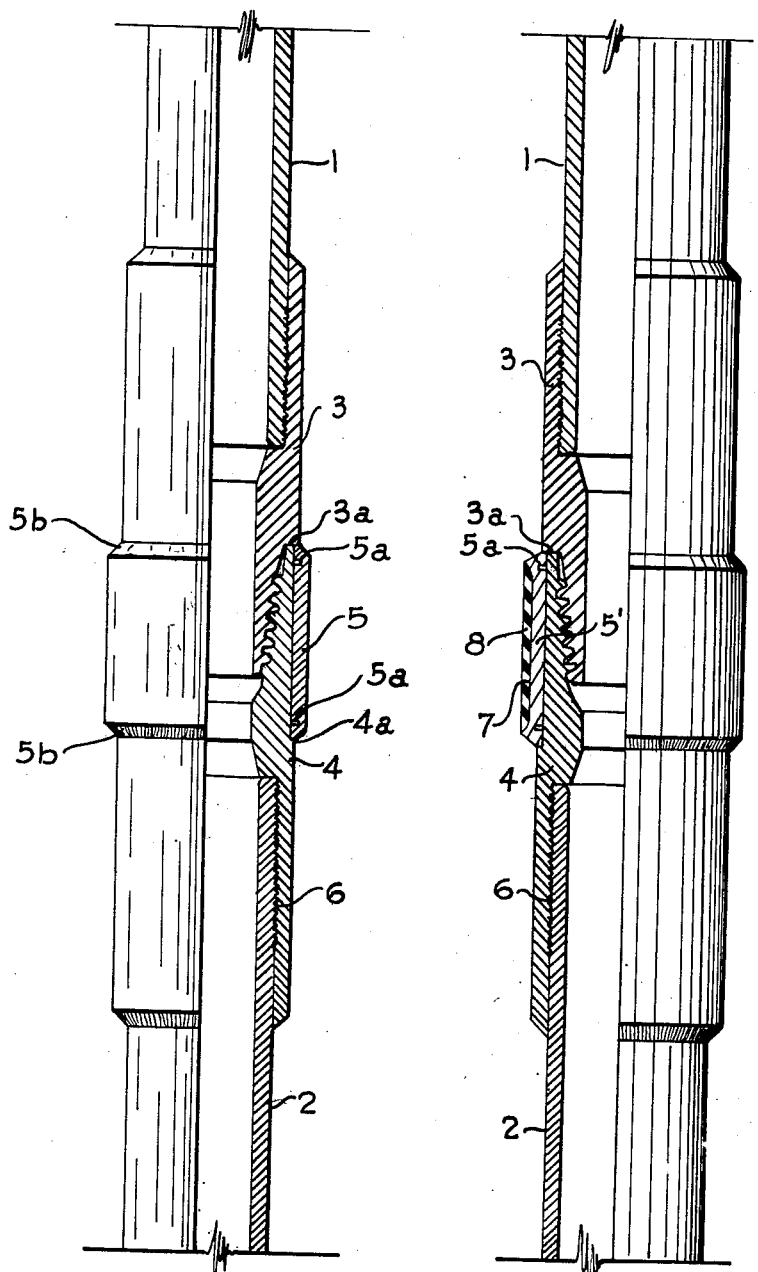

2,592,854

UNITED STATES PATENT OFFICE 2,592,854

TOOL JOINT WEAR SLEEVE

Elvin G. Boice, Houston, Tex., assignor to Reed Roller Bit Company, Houston, Tex., a corporation of Texas Application February 8, 1946, Serial No. 646,461

7 Claims. (Cl. 308—4)

This invention relates to tool joints and refers more particularly to tool joints having interchangeable wear sleeves or collars.

Heretofore wear sleeves have been mounted between opposed shoulders or abutments formed on the coupling members of the tool joint. However, in assembling the joint with a cylindrical member between the opposed shoulders of the coupling members difficulty has been experienced. The primary difficulty encountered is that of manufacturing the coupling members and wear sleeve within sufficiently close tolerance so that the ends of the cylindrical member abut the opposed shoulders of the coupling members at the exact time that a tight fit is made between the tapered thread connection of the joint.

An object of this invention is to provide a tool joint having a wear sleeve which is tightly gripped between opposed shoulders of the coupling members when the coupling members are assembled with a tight connection.

A further object is to provide a wear sleeve having a circumferential groove in its inner surface which permits slight axial compression of the sleeve when it is assembled in a tool joint.

Other and further objects of this invention will appear from the following description.

In the accompanying drawings which form a part of the instant specification and are to be read in conjunction therewith and in which like reference numerals are used to indicate like parts in the various views, Fig. 1 is a side elevation partially in section of a tool joint embodying this invention;

Fig. 2 is a view similar to Fig. 1 showing a modified form of wear sleeve.

Referring to the drawings, numerals 1 and 2 designate adjacent pipe sections of a drill stem. Mounted between the ends of the pipe sections is a tool joint comprising a conventional pin 3 and a box 4 slightly modified to retain a wear sleeve or collar 5. The wear sleeve is a cylindrical member adapted to be gripped between the shoulders 3a on the pin and 4a on the box.

In order to provide a protected joint in which the sleeve is tightly gripped between the shoulders 3a and 4a when the box and pin are tightly coupled, provision is made on the wear sleeve to permit slight axial compression on assembly of the joint. This is accomplished by providing grooves 5a in the inner surface of the wear sleeve. These grooves preferably are located adjacent the ends of the sleeve and thus provide spring portions which permit some axial compression.

The spring effect of the grooves 5a may be increased by providing tapered portions 5b on the outer edges of the sleeve. These tapered edges provide an additional reduction of the thickness of the sleeve adjacent the groove adding additional springiness to the ends of the wear sleeve.

The outer surface of the wear sleeve may be hardened in any suitable manner, such as heat treatment or by using a coating such as tungsten carbide or the like. However, these hard surfaced wear sleeves when operated within a well casing tend to abrade the casing. For this reason the modified wear sleeve 5', shown in Fig. 2 has been designed for use within the well casing. This sleeve is similar to sleeve 5 except that it has a groove 7 to receive a coating 8 of resilient material such as rubber, synthetic rubber or the like.

In operation the joint is assembled with the wear sleeve positioned between the shoulders 3a and 4a of the coupling members. Inasmuch as the wear sleeve is capable of slight axial compression the joint is tightly made by the application of the neighborhood of 12,000# torque. The sleeve is tightly gripped between the shoulders of the coupling members and the threaded tapered connection is tightly made.

Preferably, the sleeves are arranged on the drill stem so that the type having the hardened outer surface are used on the joints which will operate beneath the well casing and the modified sleeve having the resilient cushion or coating are used on the joints which will operate within the well casing. As new lengths of pipe are added to the drill stem and as additional casing is set in the well, the wear sleeves are changed to meet the new conditions pertaining to the length of the stem and depth of the casing. Thus the desirability of an interchangeable wear sleeve is believed to be obvious.

It will be seen that the objects of this invention have been accomplished. There has been provided a tool joint having an interchangeable protective sleeve in which the coupling members may be brought into a tight connection with the sleeve tightly retained between opposed shoulders on the members when the joint is assembled. The construction is such that in assembly of the joint the sleeve may be slightly axially compressed insuring a tight connection between the coupling members. The arrangement is such that as the pipe is withdrawn from and run into the well bore the wear sleeves may be readily changed from one joint to another within the drill stem.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having described my invention, I claim:

1. A tool joint comprising cooperating coupling members, a wear sleeve partially encasing at least one of said coupling members and having an external circumference greater than that of said coupling members, said coupling members having axially spaced abutments engaging the ends of said sleeve to retain the same in position on the assembled joint, said sleeve having a circumferential groove adjacent one end to enable the sleeve to be slightly axially compressed between said abutments to facilitate assembly of the joint.

2. A tool joint comprising cooperating coupling members, a wear sleeve partially encasing at least one of said coupling members and having an external circumference greater than that of said coupling members, said coupling members having axially spaced abutments engaging the ends of said sleeve to retain the same in position, said sleeve having circumferential grooves in the inner face adjacent the ends thereof to render said sleeve somewhat resilient and enable it to be slightly axially compressed between said abutments to facilitate assembly of the joint.

3. A tool joint comprising cooperating coupling members, a wear sleeve partially encasing at least one of said coupling members and having an external circumference greater than that of said coupling members, said coupling members having axially spaced abutments engaging the ends of said sleeve to retain the same in position, said sleeve having circumferential grooves in the inner face adjacent the ends thereof and having its outer edges beveled to render said sleeve somewhat resilient and enable it to be slightly axially compressed between said abutments to facilitate assembly of the joint.

4. A tool joint comprising cooperating coupling members, at least one of said coupling members having a portion of reduced diameter providing an abutment shoulder, a wear sleeve partially encasing said reduced diameter portion and having one end thereof engaging said abutment, and an abutment carried by the other coupling member and engaging the other end of said sleeve, said sleeve having circumferential grooves in the inner face adjacent the ends thereof to render said sleeve somewhat resilient and enable it to be slightly axially compressed between said abutments.

5. A tool joint as set forth in claim 1, together with an annular resilient element surrounding the exterior of the sleeve and forming a resilient outer surface on said sleeve.

6. A wear sleeve adaptable for assembly between opposed shoulders of the coupling members of a tool joint comprising, a cylindrical member having a smooth bore extending completely therethrough and having an annular groove in its inner wall spaced inwardly of and closely adjacent to one end thereof, whereby the member will undergo a limited axial compression when an axial compressive force is applied thereto.

7. A wear sleeve adaptable for assembly between opposed shoulders of the coupling members of a tool joint comprising, a cylindrical member having a smooth bore extending completely therethrough and having a pair of annular grooves formed in the inner wall thereof with each groove being disposed adjacent one end of the member, the end portions of the member having external bevelled surfaces, whereby an axial compressive force applied to the sleeve will cause a slight axial compression of the sleeve.

ELVIN G. BOICE.

REFERENCES CITED

The following references are of record in the file of this patent:

UNITED STATES PATENTS

| Number | Name | Date |
|---|---|---|
| 1,737,578 | Fentress | Dec. 3, 1929 |
| 1,912,854 | Osgood | June 6, 1933 |

FOREIGN PATENTS

| Number | Country | Date |
|---|---|---|
| 306,760 | Great Britain | Feb. 28, 1929 |